United States Patent
Swar et al.

(10) Patent No.: US 11,888,211 B2
(45) Date of Patent: Jan. 30, 2024

(54) COMMUNICATION ASSEMBLY WITH EXTENDABLE ANTENNA

(71) Applicant: Westinghouse Air Brake Technologies Corporation, Pittsburgh, PA (US)

(72) Inventors: Padam Dhoj Swar, Clarksburg, MD (US); Danial Rice, Frederick, MD (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 276 days.

(21) Appl. No.: 17/217,746

(22) Filed: Mar. 30, 2021

(65) Prior Publication Data
US 2021/0344102 A1  Nov. 4, 2021

Related U.S. Application Data

(60) Provisional application No. 63/018,911, filed on May 1, 2020.

(51) Int. Cl.
| | |
|---|---|
| *H04B 1/08* | (2006.01) |
| *H01Q 1/24* | (2006.01) |
| *H01Q 1/32* | (2006.01) |
| *H01Q 1/12* | (2006.01) |
| *H01Q 1/00* | (2006.01) |
| *H01Q 1/10* | (2006.01) |

(52) U.S. Cl.
CPC .............. *H01Q 1/24* (2013.01); *H01Q 1/005* (2013.01); *H01Q 1/10* (2013.01); *H01Q 1/1235* (2013.01); *H04B 1/082* (2013.01)

(58) Field of Classification Search
CPC ............ H01Q 1/005; H01Q 1/10; H01Q 1/12; H01Q 1/22; H01Q 1/24; H01Q 1/1235; H01Q 1/32; H04B 1/08; H04B 1/082; H04B 1/086; H04B 1/03
See application file for complete search history.

(56) References Cited

U.S. PATENT DOCUMENTS

| | | | | |
|---|---|---|---|---|
| 4,323,902 A | * | 4/1982 | Hussey ................... | H01Q 1/103 343/903 |
| 4,464,664 A | * | 8/1984 | Edwards ................... | H01Q 1/10 343/903 |
| 4,675,687 A | * | 6/1987 | Elliott ..................... | H01Q 5/321 343/903 |
| 5,189,435 A | * | 2/1993 | Yarsunas .................. | H01Q 1/10 343/903 |

(Continued)

*Primary Examiner* — Blane J Jackson
(74) *Attorney, Agent, or Firm* — The Small Patent Law Group LLC; Philip S. Hof

(57) ABSTRACT

A communication assembly includes a housing, a communication device, an extendable mast, and a control circuit. The housing is configured to be mounted on a vehicle. The communication device includes an antenna and is disposed at least partially within the housing. The extendable mast is mechanically coupled to the housing and supports the antenna. The control circuit is operably coupled to the mast and is configured to generate a signal to raise the mast from a first position of a distal end of the mast to a second position of the distal end in response to determining occurrence of a designated raise event. The antenna extends a greater distance from the housing in the second position of the mast than in the first position.

18 Claims, 5 Drawing Sheets

(56) References Cited

U.S. PATENT DOCUMENTS

| | | | |
|---|---|---|---|
| 5,398,276 A * | 3/1995 | Lemke | H04W 24/00 379/1.01 |
| 5,681,015 A * | 10/1997 | Kull | B61L 15/0081 246/167 R |
| 5,835,070 A * | 11/1998 | Scaraglino | H01Q 1/087 343/903 |
| 6,081,769 A | 6/2000 | Curtis | |
| 6,322,025 B1 | 11/2001 | Colbert et al. | |
| 6,782,044 B1 | 8/2004 | Wright et al. | |
| 6,839,664 B1 | 1/2005 | Kull | |
| 9,083,861 B2 | 1/2015 | Haas et al. | |
| 9,168,936 B2 | 10/2015 | Grimm et al. | |
| 9,846,025 B2 | 12/2017 | Kirchner et al. | |
| 9,950,718 B2 * | 4/2018 | Naylor | B61L 15/0072 |
| 2007/0236079 A1 | 10/2007 | Kull | |
| 2014/0081487 A1 | 3/2014 | Wolf | |
| 2017/0250463 A1 * | 8/2017 | Wyckoff | H01Q 3/06 |

\* cited by examiner

COMMUNICATION ASSEMBLY WITH EXTENDABLE ANTENNA

RELATED APPLICATIONS

This application claims priority to U.S. Provisional Application No. 63/018,911, filed on 1 May 2020 and entitled "Communication Assembly With Extendable Antenna," the entire disclosure of which is incorporated by reference.

BACKGROUND

Technical Field

Embodiments of the present disclosure relate to devices that transmit and/or receive radio frequency (RF) signals via the use of antennas.

Discussion of Art

Many types of vehicles include metal body panels that can obstruct or interfere with the communication of wireless signals that impinge upon the metal panels. The interference can cause delayed message receipt, missed data packets, and/or degraded signal quality at the receiver device relative to unobstructed wireless communication pathways. Furthermore, cargo carried by some types of vehicles, such as transport vehicles, may also obstruct or interfere with wireless communications, even if the body of the vehicle does not. For example, rail-based flat cars may carry metal intermodal containers that can obstruct wireless communications. The obstructions can affect status messages, control messages, alert messages, and the like that are communicated between devices on different vehicles, such as different vehicles on a common vehicle system. Substantial obstruction can prevent the intended recipient device from receiving the message or prevent the recipient device from being able to interpret the contents of the message, which can have significant, undesired ramifications, such as reducing a level of control of the vehicle, triggering an automatic stop or slow order as a failsafe measure, or the like.

BRIEF DESCRIPTION

In one or more embodiments, an assembly (e.g., a communication assembly) is provided that includes a housing, a communication device, an extendable mast, and a control circuit. The housing is configured to be mounted on a vehicle. The communication device includes an antenna and is disposed at least partially within the housing. The extendable mast is mechanically coupled to the housing and supports the antenna. The control circuit is operably coupled to the mast and is configured to generate a signal to raise the mast from a first position of a distal end of the mast to a second position of the distal end in response to determining occurrence of a designated raise event. The antenna extends a greater distance from the housing in the second position of the mast than in the first position.

In one or more embodiments, a method (e.g., for controlling an extendable mast) is provided that includes determining, via a control circuit of a communication assembly disposed on a vehicle, occurrence of a designated raise event. The communication assembly includes a housing and an extendable mast mechanically coupled to the housing. Responsive to determining the occurrence of the designated raise event, the method includes automatically generating a signal to raise the mast from a first position of a distal end of the mast to a second position of the distal end. The mast mechanically supports an antenna of a communication device of the communication assembly, and the antenna extends a greater distance from the housing in the second position of the mast than in the first position.

In one or more embodiments, an assembly (e.g., a communication assembly) is provided that includes a housing, an extendable mast, an antenna, and a control circuit. The housing is configured to be mounted on a vehicle. The mast is mechanically coupled to the housing and configured to extend and retract relative to the housing to control a position of a distal end of the mast. The antenna is mechanically coupled to and supported by the mast. The control circuit is operably coupled to the mast and configured to generate a first signal to raise the mast from a first position of the distal end to a second position of the distal end in response to determining occurrence of a designated raise event. The antenna extends a greater distance from the housing in the second position of the mast than in the first position. The control circuit is configured to generate a second signal to lower the mast from the second position of the distal end to the first position and/or a third position of the distal end in response to determining occurrence of a designated lower event.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments described herein are directed to a communication assembly with an adjustable antenna mast. The mast holds and supports at least one antenna of the assembly. The antenna is configured to receive and/or transmit RF signals with offboard communication devices, such as satellites, other vehicles, wayside devices, and the like. The mast can extend and retract in length relative to a housing of the assembly to which the mast is mounted. The mast may extend by telescoping along an axis. Extension of the mast increases a distance that the antenna projects from the housing. Extension of the mast can serve to enable the antenna to project beyond local obstructions on the vehicle, such as adjacent metal vehicle walls and/or metal cargo. Without extending the mast, the local obstructions may be disposed in a communication pathway (e.g., line of sight)

between the antenna and the offboard communication device, and the obstructions can interfere with wireless communications to and from the antenna. Extending the mast can enable the antenna to achieve an unobstructed, or less obstructed, communication pathway, which can increase the quality of communications (e.g., higher signal-to-noise ratio) and reduce the number or risk of missed communications (e.g., dropped packets), relative to communicating with obstructions in the communication pathway. The mast is retractable from the extended state. Retracting the mast can also provide several benefits, such as reducing the risk of damage to the mast and antenna. For example, in the extended state the mast and antenna could be more vulnerable to collisions with off-board structures, such as bridges and tunnels, and damage due to wind, inertia, vibration, and/or the like, relative to being in the retracted state. The one or more embodiments described herein also provide a method for controlling the extension of the antenna mast.

Figures 1, 2:
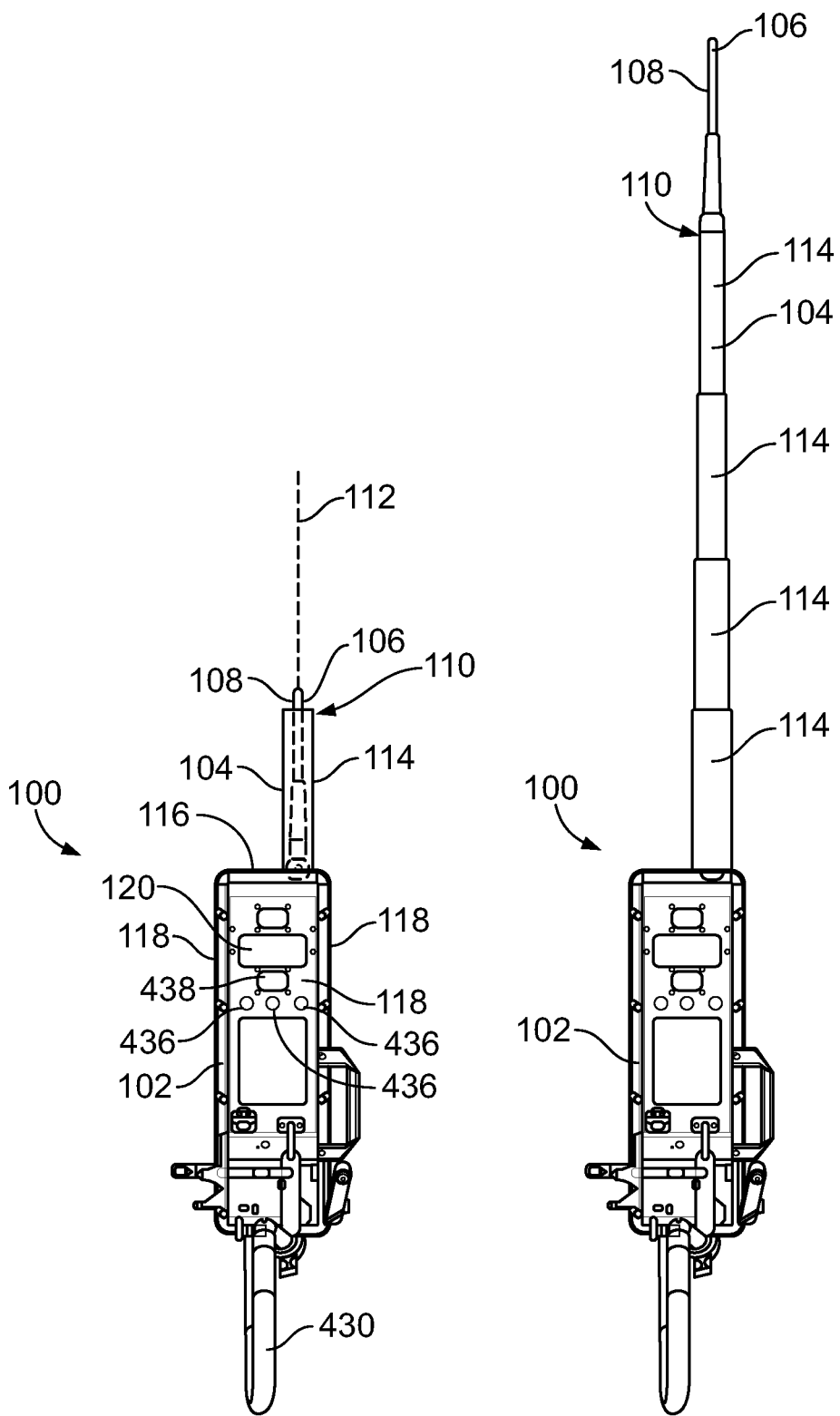
FIG. 1 illustrates a communication assembly according to an embodiment.
FIG. 2 illustrates the communication assembly of FIG. 1 with the mast in an extended position relative to the position of the mast in FIG. 1.

FIG. 1 illustrates a communication assembly 100 according to an embodiment. The communication assembly is a communication apparatus or device that is configured to be mounted or installed on a vehicle. In an embodiment, the communication assembly, also referred to herein simply as assembly, is removably mounted to a vehicle using a securing mechanism. The securing mechanism enables the assembly to be selectively moved between and mounted to multiple different vehicles over time. The assembly includes a housing 102, a mast 104, and an antenna 106. The housing is box-like, including multiple panels that define an interior volume. The housing may be sealed to prevent the ingress of debris and moisture into the interior volume. The housing includes an attachment mechanism for removably mounting the housing to a vehicle.

The mast is mechanically coupled to the housing and projects from the housing. In the illustrated embodiment, the mast is coupled to a top wall 116 of the housing and projects upward. In another embodiment, the mast can be coupled to a side wall 118 of the housing that extends from the top wall, with the mast oriented to project in the same upward direction. The antenna is mechanically coupled to and supported by the mast. For example, the antenna may include or represent at least one electrically conductive wire that is disposed within the mast. The mast protects the conductive wire or wires from impacts and environmental conditions. In the illustrated embodiment, a covered segment 108 of the antenna projects beyond a distal end 110 of the mast. In an alternative embodiment, no part of the antenna projects beyond the distal end of the mast. The antenna is operably connected to a device inside the housing. The device may include or represent a communication device for bi-directional communication with other vehicles, dispatch facilities, wayside devices, and the like, or for receiving signals from satellites. Optionally, the mast may hold and support multiple antennas, such as a first antenna of a communication device and a second antenna of a receiver device. In an alternative embodiment, the assembly may include two or more masts that hold and support different corresponding antennae.

The mast is extendable to modify the length of the mast projecting from the housing. In FIG. 1, the distal end of the mast is located at a first position relative to the housing. FIG. 2 illustrates the communication assembly of FIG. 1 with the mast in an extended position relative to the position of the mast in FIG. 1. In FIG. 2, the distal end of the mast is located at a second position relative to the housing. The second position is farther from the housing than the first position relative to the housing. When the mast is in the extended, second position, the antenna extends a greater distance from the housing than the distance that the antenna extends in the retracted, first position.

In one or more embodiments, the extension and retraction of the mast is automatically controlled by an actuator device. The actuator may be powered by electric current, compressed air, or the like. Optionally, the mast may be manually extendable instead of, or in addition to, being automatically extendable. The mast may include multiple interconnected segments 114 that move relative to one another during the extension and retraction processes. In an embodiment, the mast telescopes along an axis 112. The interconnected segments are nested tubes or sleeves that move along the axis. Optionally, the tubes may have helical threads or tracks that convert rotational movement into linear movement along the axis. For example, an operator or an actuator may elongate the mast by twisting/rotating one tube that causes, via the helical threads, one or more other tubes to linearly move relative to the tube that is rotated. In an alternative embodiment, the adjacent interconnected segments may be connected via hinges, and the mast extends by unfolding at the hinges.

Figure 3:
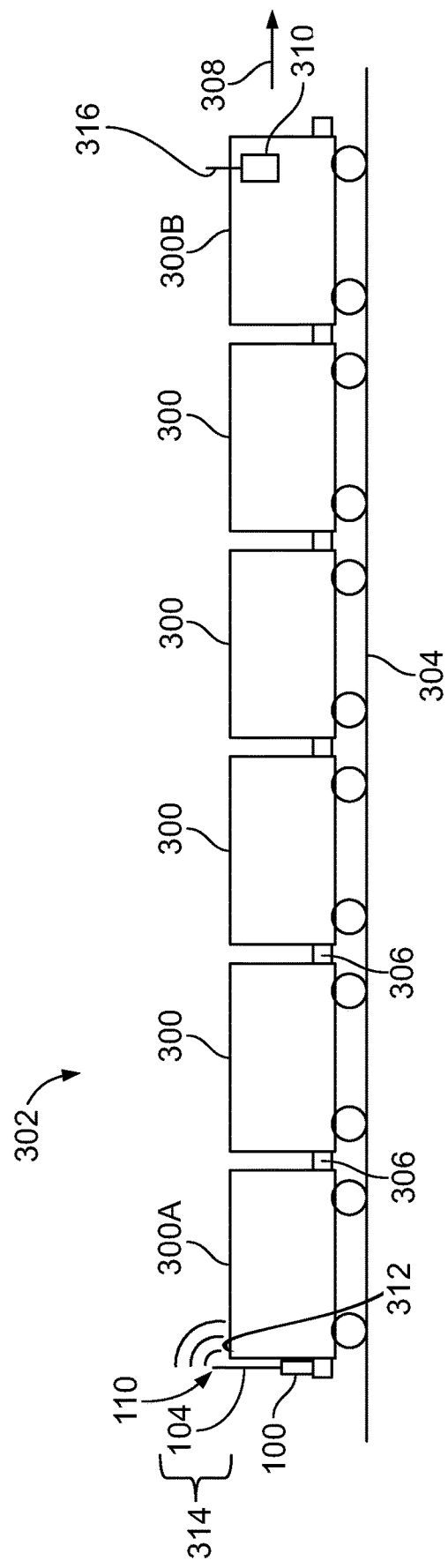
FIG. 3 illustrates the communication assembly mounted onboard a vehicle of a vehicle system according to an embodiment.

FIG. 3 illustrates the communication assembly 100 mounted onboard a vehicle 300A of a vehicle system 302 according to an embodiment. The vehicle system is land-based and travels on a route 304. The vehicle system includes multiple vehicles 300 mechanically coupled in a line to travel together along the route. Adjacent vehicles are connected via couplers 306. One or more of the vehicles in the vehicle system are configured to generate tractive effort for propelling the vehicle along the route. The vehicle system optionally may be longer and include more vehicles than the six vehicles illustrated in FIG. 3. In an embodiment, the vehicle system can be a railroad train, and the route is a track. In other examples, the assembly can be disposed onboard another type of vehicle, such as a train formed by multiple trucks (e.g., highway semi-truck, mining truck, logging truck, or the like), automobiles, buses, and/or the like, and the route can be a paved road, an off-road path, or the like. In an alternative embodiment, at least some of the vehicles of the vehicle system are mechanically separate (e.g., spaced apart without any linkage tethering the vehicles together). For example, mechanically separate propulsion-generating vehicles may be communicatively connected to each other to travel with coordinated movements along the route based on wireless control signals (e.g., to travel as a convoy).

In the illustrated embodiment, the communication assembly with the extendable mast 104 is disposed on the vehicle that defines a rear end of the vehicle system based on a direction of travel 308 of the vehicle system. The assembly can be an end-of-system device that communicates with one or more of the other vehicles of the vehicle system for integrity checks, status updates, emergency braking commands, and the like. In one embodiment, the assembly is an end-of-train (EOT) device. The assembly may periodically communicate with a lead vehicle 300B that defines a front end of the vehicle system. The assembly can communicate with a communication device 310 onboard the lead vehicle using a dedicated radio link. The integrity check may include information that confirms that the rear end of the vehicle system is intact and properly operating, even if the rear end is not visible to an operator or a camera located at the lead vehicle. For example, the information that is periodically communicated to the lead vehicle from the assembly may include a brake pipe pressure in the rear vehicle 300A, motion status of the rear vehicle (e.g., stationary or moving, vehicle speed, etc.), emergency braking valve status, health and/or charge state of a battery of the assembly, On or Off status of a marker light 120 (shown in FIG. 1) of the assembly, and the like. The emergency braking valve allows for a secondary emergency application in case of a brake pipe blockage. The marker light is a high visibility light or array of lights that enables people and other vehicle systems to see the rear end of the vehicle system during reduced light conditions (e.g., at night, in tunnels, through forests, and the like). The content of the periodic status messages sent by the assembly to the lead vehicle can be displayed to an operator/engineer on the lead vehicle. In addition to transmitting periodic status messages, the communication assembly may be configured to send aperiodic messages, such as alert messages, to the lead vehicle in response to detecting an alarm condition. For example, the alarm condition may include the brake pipe pressure in the rear vehicle being outside of a designated pressure range (that represents an acceptable pressure range).

The extendable mast of the assembly is extended such that the distal end 110 of the mast is disposed above the height of the rear vehicle 300A. For example, the distal end projects above a top edge 312 of a portion of the rear vehicle adjacent to the mast. The top edge can represent a back wall or body panel of the rear vehicle. In an alternative embodiment, the top edge can represent a portion of cargo carried by the rear vehicle, such as an intermodal container. By extending the mast beyond the top edge, the antenna supported by the mast can communicate without the rear vehicle causing substantial obstruction or interference of the communicated signals. For example, as shown in FIG. 3, the antenna at the distal end of the mast has an unobstructed communication pathway 314 with an antenna 316 of the communication device at the lead vehicle above the vehicles of the vehicle system. The communication pathway 314 can represent a clear line of communication between the devices, even if the devices are not within a line of sight of each other due to the length of the vehicle system, route curvature, trees, and/or the like.

When the mast is retracted, the distal end of the mast may be positioned below the upper edge of the rear vehicle. In the retracted position, communication quality and success rate may be degraded relative to the mast in the extended position because the rear vehicle and/or other vehicles obstruct and interfere with wireless signal transmission. For example, the back wall of the rear vehicle and/or cargo on the rear vehicle can function as a shield that blocks wireless signals that impinge upon the wall. The communication quality may refer to the signal-to-noise ratio, the amount or percentage of a transmitted message that is received and able to be unpacked or interpreted at the recipient, or the like. For example, a greater communication quality may enable more of a transmitted message to be received and unpacked at the recipient than a reduced communication quality. The success rate may refer to a rate or percentage of messages in a series of messages that are successfully received and interpreted at the intended recipient device. A greater success rate indicates that fewer messages are undelivered or lost, relative to a lower success rate. Considering that the assembly may be utilized to communicate periodic status messages for system integrity checks and to communicate alert messages, extending the mast to the extended position shown in FIG. 3 increases the likelihood of such messages being received by the lead vehicle and thereby ensures the safety and continued, unaltered operation of the vehicle system traveling along the route.

In an embodiment, the mast can also hold an antenna of a device that receives RF signals from satellites. For example, the device may be a location determining device, such as a GPS receiver. Extending the mast to the extended position can also provide an unobstructed communication pathway with one or more satellites from which the antenna receives signals. For a GPS receiver, the unobstructed communication pathway can enable a more precise determination of the location of the GPS receiver/rear vehicle relative to the location determination that can be made while the mast is retracted. The more precise location determination can improve vehicle system handling operations, such as providing confidence to allow a trailing vehicle system on the route to travel closer to the rear vehicle and/or enables more accurately implementing location-based vehicle tractive and braking settings, as defined in a trip plan.

Figure 4:
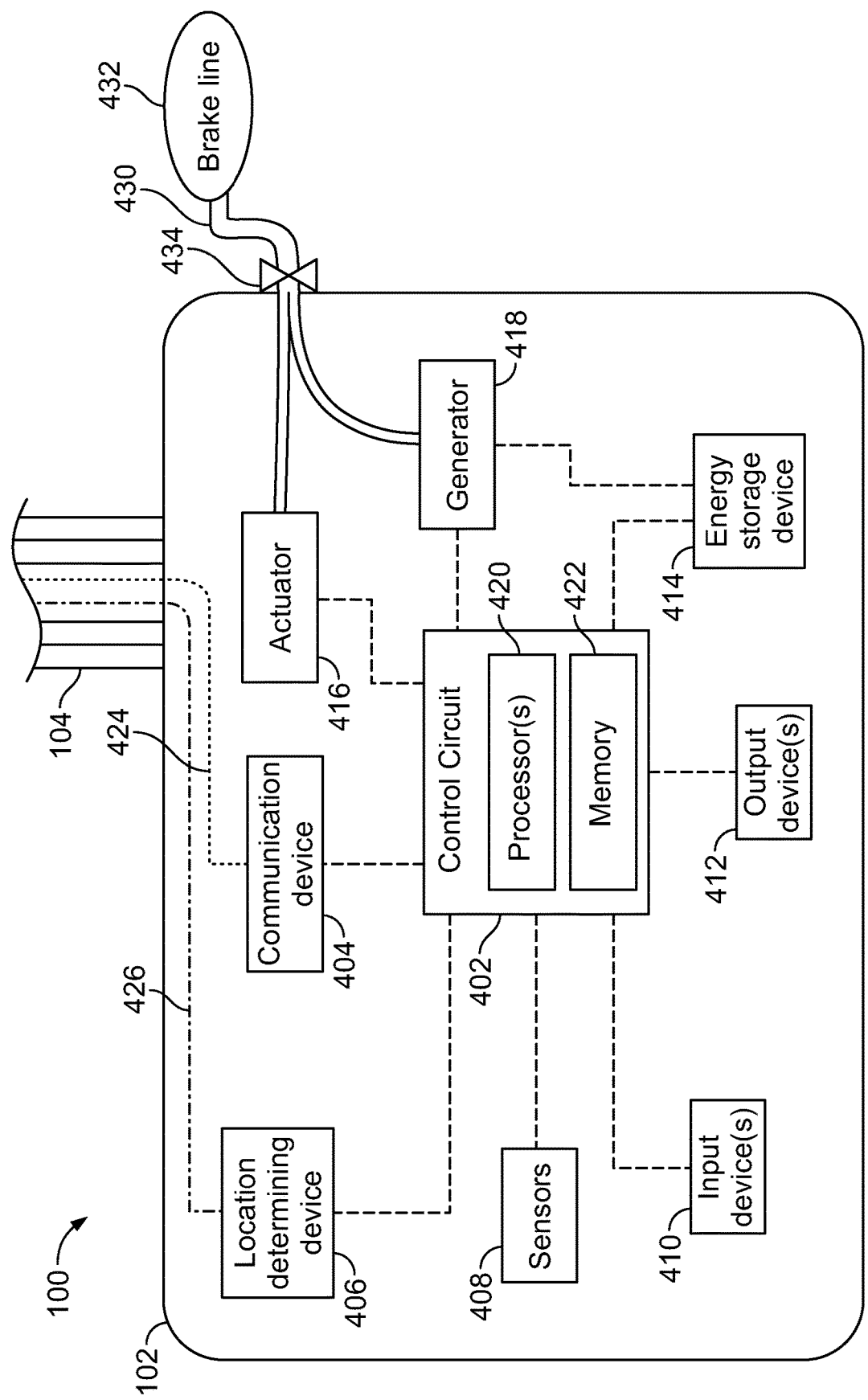
FIG. 4 is a schematic illustration of the communication assembly according to an embodiment.

FIG. 4 is a schematic illustration of the communication assembly 100 according to an embodiment. The assembly includes various electronic components or devices that are represented as boxes in FIG. 4. The components include a control circuit 402, a communication device 404, a location determining device 406, one or more sensors 408, one or more input devices 410, one or more output devices 412, an energy storage device 414, an actuator 416, and a generator 418. The communication assembly in other embodiments may include at least one additional component that is not shown in FIG. 4 and/or may omit one or more of the components shown in FIG. 4. For example, the assembly may lack the generator in one alternative embodiment, may lack the location determining device in a second alternative embodiment, and may lack the actuator in a third alternative embodiment. The inclusion of optional electronic components in the assembly may be based on application-specific needs and availability, as described herein. The electronic components may be commonly disposed within the housing 102 of the assembly. Alternatively, one or more of the components may be outside of the housing and coupled to the housing.

The control circuit (or controller) is operably connected to the other electronic components via wired and/or wireless communication pathways. For example, the control circuit may be conductively connected to the electronic components via wires, cables, bus bars, or the like. The control circuit performs at least some of the operations described herein to determine when and how to control the positioning of the extendable antenna mast. The control circuit represents hardware circuitry that includes and/or is connected with one or more processors 420 (e.g., one or more microprocessors, integrated circuits, microcontrollers, field programmable gate arrays, etc.). The control circuit includes and/or is connected with a tangible and non-transitory computer-readable storage medium (e.g., memory) 422 disposed onboard the vehicle. For example, the memory may store programmed instructions (e.g., software) that is executed by the one or more processors to perform the operations of the control circuit described herein. The memory additionally or alternatively may store different information, such as (i) a route database, (ii) a trip schedule, (iii) a trip plan that provides tractive and braking settings associated with different locations along the route, and/or (iv) information about the vehicle on which the assembly is mounted (e.g., type of vehicle such as make and model, vehicle dimensions such as height of rear wall that would be adjacent to the assembly, etc.).

The communication device can include or represent circuitry for wirelessly communicating electrical signals. For example, the communication device can represent transceiving circuitry, at least one antenna 424, and associated circuitry. The transceiving circuitry may include a transceiver or a separate transmitter and receiver. The communication device may communicate RF electrical signals, such as signals in the ultra-high frequency (UHF) range. The electrical signals can represent data packets that in the aggregate form messages. In various embodiments, the control circuit can generate messages that are communicated off-board by the communication device. The communication device can receive messages and forward the messages to the control circuit for analysis of the contents of the received messages.

The location determining device is configured to determine the respective location of the assembly, which indicates the location of the vehicle on which the assembly is mounted. When the vehicle is disposed at the rear end of the vehicle system, as shown in FIG. 3, then the location determining device can provide the location of the rear end of the vehicle system. The location determining device can include a receiver, at least one antenna 426, and associated circuitry. In an embodiment, the location determining device may be configured to receive signals from satellites. For example, the device may be a global positioning system (GPS) device that generates a three-dimensional positional coordinate in a global coordinate system based on signals received from satellites. In an alternative embodiment, the location determining device can determine the location of the assembly based on a calculated distance from the assembly to a reference device (e.g., a cellular tower, wayside device, or the like) as the vehicle system travels along the route. The reference device is disposed at a known location along the route. The location determining device may measure an elapsed time for a signal to be communicated to the reference device and back to determine a separation distance between the devices. The location of the location determining device along the route can be calculated based on the known location of the reference device and the separation distance.

In the illustrated embodiment, both the antenna 426 of the location determining device and the antenna 424 of the communication device extend from the respective circuitry in the housing into the extendable mast 104. The antennae may have lengths that are at least the length of the mast in the fully extended position to enable to the antennae to project beyond the upper edge of the vehicle as shown in FIG. 3. When the mast is retracted, the excess slack of antennae may be spooled or wound.

The actuator is mechanically coupled to the mast and is configured to exert a force on the mast to raise the mast. The actuator may operate based on control signals received from the control circuit. In the illustrated embodiment, the actuator is pneumatic and operates using compressed fluid to power the mast movement. For example, the actuator is fluidly coupled to a hose 430 that extends from the housing to a brake line 432 of the vehicle. The hose is shown in FIG. 1. The hose conveys compressed air from the brake line to the actuator. The pressure of the compressed air can be used to force the extension of the mast. The force exerted on the mast can be controlled by selectively opening and closing one or more valves 434. In another embodiment, the actuator may consume electric current to power the mast movement. For example, the actuator may be a small motor, such as a servo motor or the like. The actuator may receive the electric current from the generator and/or the energy storage device.

The optional generator is configured to generate electric current using compressed air received from the brake line. For example, the generator may include a turbine that is rotated based on the flow of pressurized air across the turbine. The rotation of the turbine may rotate a rotor relative to a stator, which induces electric current based on a changing magnetic fields. The energy generated by the generator can be supplied to the energy storage device and/or to the actuator. The energy storage device includes or represents one or more battery cells, capacitors, or the like. In an embodiment, the energy storage device can be recharged by current received from the generator. The energy storage device can power the various loads of the communication assembly.

The input device(s) of the assembly can include one or more buttons, switches, a touchpad, a joystick, a mouse, or the like. The input device(s) enable an operator at the assembly to provide manual inputs and selections, such as to input a vehicle identifier for establishing a communication link with another vehicle, turn On or Off power of the assembly, and the like. The assembly in FIG. 1 shows three buttons 436 that represent input devices. The output device(s) of the assembly can include display, one or more lights, audio speaker, and the like. For example, the marker light 120 (shown in FIG. 1) represents an output device. The assembly in FIG. 1 also includes a small display screen 438 proximate to the buttons that provides visual feedback to an operator.

The sensors can include various different types of sensors for monitoring certain conditions and parameters that can be used by the control circuit for determining when and how to adjust the mast height. At least some of the sensors may be coupled to an outer surface of the housing or disposed remote from the housing instead of within the housing. The sensors can include a wind speed sensor, a vehicle speed sensor, an accelerometer, a brake sensor, a proximity sensor, a pressure sensor, a camera, and/or the like. The sensors generate sensor data that is transmitted as signals to the control circuit, which analyzes the sensor data.

In an embodiment, the control circuit is configured to receive information from various electronic components of the assembly, including the communication device, the location determining device, the sensors, and the input device(s), and monitors the received information to determine the occurrence of one or more designated raise events and/or designated lower events. The raise and lower events serve as triggers that motivate the control circuit to adjust the height of the antenna mast. The descriptions of the various raise and lower events can be stored in the memory and/or hardwired into the logic of the one or more processors. In response to determining the occurrent of a raise event, the control circuit generates a signal to raise or extend the mast, such as from the first position shown in FIG. 1 to the second position shown in FIG. 2. In response to determining the occurrence of a lower event, the control circuit generates a signal to lower or retract the mast, such as from the second position shown in FIG. 2 to the first position shown in FIG. 1 or to a different, third position that is between the first and second positions.

In one or more embodiments, the assembly can operate fully autonomously without requiring operator intervention to prompt the mast adjustment or to perform the mast adjustment. In the automated examples, responsive to determining occurrence of a raise event or lower event based on sensor data, location data, and/or the like, the control circuit generates a control signal that is communicated to the actuator. The actuator, upon receipt of the control signal, automatically raises or lowers the mast based on the characteristics of the control signal. For example, the control signal may control a fluid valve to open to allow compressed air from the brake line through the valve into the mast to force the mast to raise. To lower the mast, the control signal may control a release valve to open to allow compressed air to exit the mast. The weight of the mast may cause the mast to retract due to the lack of air pressure maintaining the mast in the raised position. In another example, the control signal may control a motor of the actuator to rotate a designated amount (e.g., quantified in steps) which causes the mast to raise or lower a corresponding length.

In one or more alternative embodiments, the movement of the mast may be semi-automated. In a first semi-automated example, an operator input device is used to manually command the automated movement of the mast up and down. For example, the operator may push one of the dedicated buttons 436 on the assembly, which can represent the input device. Optionally, the operator input device that provides the input can be an off-board device, such as a handheld mobile device or an output device located on another vehicle. The operator at the lead vehicle of the vehicle system can select a mast raise function on an input device integrated on the lead vehicle, and the communication device 310 (shown in FIG. 3) can transmit the operator command to the communication device 404 of the assembly. The manually input command can be electronically conveyed to the control circuit. The receipt of the manual input command at the assembly can represent a designated raise event or lower event. In response to receiving the input command, the control circuit generates the control signal, as described above, for automatically extending or retracting the mast via the actuator.

In a second semi-automated example, the assembly prompts an operator to manually adjust the mast up or down based on an autonomously-determined raise or lower event. The manual intervention relates to the triggering event in the first semi-automated example above, and the manual intervention relates to the mast adjustment in this second example. Upon determining the occurrence of a raise event or lower event, the control circuit generates an alert signal that is communicated to an output device. The output device uses the alert signal to generate a notification that instructs the operator to manually adjust the mast. The assembly according to this example may lack the actuator shown in FIG. 4. The output device that receives the alert signal may be an output device 412 of the assembly, such as the display screen 438 shown in FIG. 1. For example, the assembly may flash one or more lights, emit a sound, and/or display a text-based message on the display that instructs an operator viewing the display to raise the mast or lower the mast. Optionally, the communication device of the assembly may transmit the alert signal to an off-board device, such as a handheld mobile device or an output device located on another vehicle.

There are various conditions and/or events that can be designated as triggers for raising the mast. For example, one or more designated raise events may be associated with the start-up of a vehicle or vehicle system while stationary and/or during initial movement along the route. The mast may be in a retracted position when not in use, such as when the vehicle is stationary for an extended period of time. The default retracted position may reduce the risk of damage to the mast caused by wind or other environmental conditions, impacts from equipment, and/or the like, relative to the mast being in an extended position. In an embodiment, the mast may be configured to extend to a raised position as a default position during travel of the vehicle or vehicle system along the route in order to increase communication quality and success by avoiding obstructions in the communication pathways. There are various events that occur during vehicle start-up that can be used as designated raise events.

In one example, initiation of a communication linking procedure, or arming procedure, is a designated raise event. The communication linking procedure is performed to establish a communication link between the communication device of the communication assembly and a second communication device on another vehicle. The communication link may represent a designated RF frequency range or channel. With reference to FIG. 3, the communication device 310 on the lead vehicle 300B can represent the second communication device. The communication linking procedure can be initiated by one of the communication devices communicating a link request message that is received by the other communication device. The recipient device then transmits a link response message back to the sender. A communication link between the two communication devices can be established upon receipt of the link response message by the sender of the link request message. During subsequent travel of the vehicles along the route, the two communication devices can communicate with each other via the communication link. The control circuit may determine that the communication linking procedure is initiated based on the communication device of the assembly receiving the link request message and/or sending the link request message.

Another designated raise event involved with vehicle start-up may be detecting that the vehicle is in motion. For example, the control circuit may receive signals from a motion sensor that indicates that the vehicle is moving relative to the route. The motion sensor may be an accelerometer, a vehicle speed sensor, or the like. Upon detecting that the vehicle is in motion, based on the sensor signals, the control circuit may generate the signal to raise the mast. Yet another designated raise event may be detecting that brakes of the vehicle are released, which can indicate impending movement. The control circuit may receive signals from a sensor associated with the brakes. The sensor may be a position sensor or proximity sensor that can indicate that the brakes are not engaged with the wheels and/or axles, a pressure sensor that can detect a pressure in the brake line that is associated with the brakes being released, an audio sensor that can detect a sound associated with the release of air from a brake system, or the like. Upon detecting that the brakes are released, based on the sensor signals, the control circuit may generate the signal to raise the mast.

The designated raise event may occur based on a condition experienced as the vehicle travels along the route. In one example, the designated raise event may be based on sub-standard communication conditions between the communication device of the assembly and a second communication device off-board the vehicle. For example, the communication devices may be configured to send periodic communications at designated time intervals. The assembly at the end of the vehicle system can send a status update message every minute, for example, for a system integrity check. The communication device that receives the status update message may transmit a receipt confirmation messages to the assembly confirming that each status update is received. In an embodiment, the lack of receipt of an expected periodic message from the recipient communication device can indicate total communication loss between the two devices. For example, after communicated a status update message, if the assembly does not receive a confirmation message for at least a designated amount of time from the message send time, such as 45 seconds, then the assembly communication device may resend the update message. If no confirmation is received after another designated amount of time, then the control circuit may determine that communication is lost between the devices. The communication loss can be a designated raise event because the loss of communication can potentially be caused by obstructions in the wireless communication pathway. Raising the mast can enable the antenna to extend beyond the obstructions, reestablishing communication with the second communication device.

In another example related to sub-standard communication conditions, the control circuit may be configured to analyze received messages from the second communication device to grade the quality of the messages. If the determined communication quality of multiple messages received from the second communication device is below a designated threshold level, the control circuit can label the messages as having a degraded communication quality. The quality of the messages may be based on one or more parameters, such as signal-to-noise ratio. Upon labeling the messages as having degraded communication quality, the control circuit generates the signal to raise the mast. Identifying received messages as having degraded communication quality can be a designated raise event because messages having insufficient quality may not be able to be accurately interpreted and analyzed, such that the effect may be similar to total communication loss. Raising the mast can improve the signal quality by positioning the antenna beyond local obstructions.

One or more designated raise events may be based on a location of the vehicle along the route. For example, the location signals generated by the location determining device on the assembly can be analyzed by the control circuit. The memory of the control circuit may store a route database that provides a map of the route and various information about different segments of the route. The control circuit may compare the location signals with the map to determine the location of the vehicle relative to the route at different times during a trip. Optionally, the route database may indicate specific segments of the route that are associated with degraded communications. The degraded communication segments, or dead zones, may be determined based on historical data and/or observations from previous trips along the route. The dead zones may have wayside structures or route features that obstruct radio communications. For example, if a route winds around a mountain, the mountain may obstruct communications between the front vehicle and rear vehicle of a long vehicle system. The designated raise event may be the control circuit determining, based on the location signals and the route database, that the vehicle is approaching or entering a dead zone. Raising the mast for traveling through a dead zone can improve the chance of having successful communications by avoiding local obstructions on the vehicle system itself.

In another example, the route database may indicate specific segments of the route that have height restrictions and/or that lack height restrictions. The height restrictions may include tunnels, overpasses, a low canopy of tree branches, of the like. When the mast in the fully raised or extended position, the mast may extend higher than other portions of the vehicle, as shown in FIG. 3. However, the mast in the raised position can be damaged if the mast collides with trees or more solid structures above the vehicle. In an embodiment, the control circuit can determine, based on the location signals and route database, that the upcoming segment or segments are clear of height restrictions. Upon determining that there is no risk of collision along the next segment of route, the control circuit can raise the mast higher for the benefit of achieving improved communications.

The mast and/or actuator may be able to position the distal end at various different locations along a range between a fully retracted position and a fully raised position. In an embodiment, the distance that the mast is extended in response to a raise event may be based on the height of the vehicle, such as the height of the vehicle walls and/or onboard cargo. For example, if the mast is extendable to a height of 25 feet from the ground, and the vehicle on which the assembly is mounted has a height of 10 feet, it may not be advisable to extend the mast to the fully raised position. For example, the mast generally may be more vulnerable to damage due to wind, inertial forces, vibration, and the like the farther the mast extends. In the scenario above, raising the mast to a height of 11 or 12 feet would potentially improve communications by avoiding the obstruction caused by the 10 foot tall vehicle, without raising the mast the full height.

Figure 5:
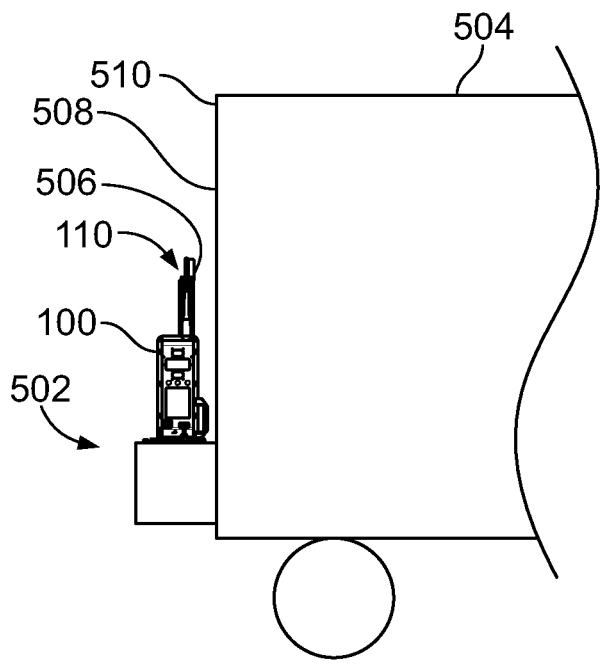
FIG. 5 illustrates the communication assembly mounted at a rear end of a vehicle and disposed in a retracted position.
Figure 6:
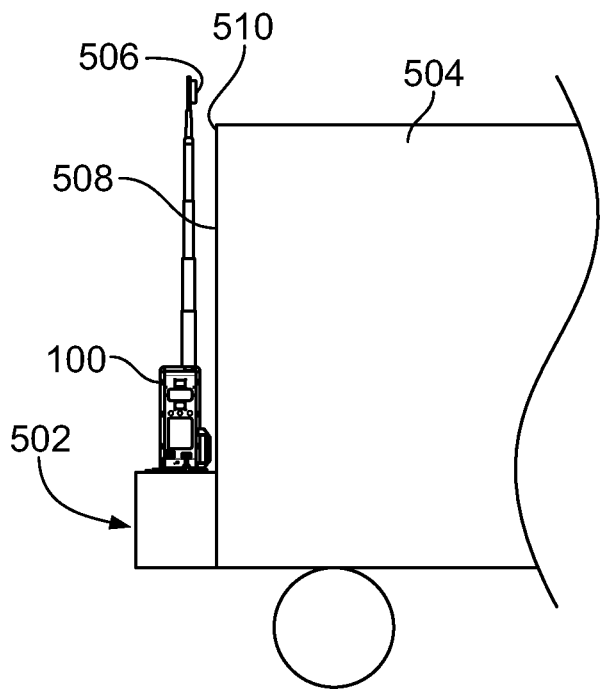
FIG. 6 illustrates the communication assembly and vehicle of FIG. 5 with the mast in a raised or extended position according to an embodiment.

FIG. 5 illustrates the communication assembly 100 mounted at a rear end 502 of a vehicle 504 and disposed in a retracted position. FIG. 6 illustrates the communication assembly 100 and vehicle 504 of FIG. 5 with the mast in a raised or extended position according to an embodiment. The assembly includes a proximity sensor 506 mounted on the mast 104 at or proximate to the distal end 110. In response to determining the occurrence of a designated raise event, the control circuit controls the actuator to begin raising the mast. In an embodiment, the proximity sensor is directed at a rear structure 508 of the vehicle. The rear structure can represent a portion of the vehicle itself and/or a portion of cargo carried by the vehicle. The proximity sensor generates sensor signals that indicate whether the sensor is proximate to the rear structure at the current position of the sensor. The control circuit receives and analyzes the sensor signals as the mast rises. Once the sensor on the mast raises beyond a top edge 510 of the vehicle, the sensor signals generated by the sensor may change, indicating that there is no portion of the vehicle adjacent to the sensor. Based on the sensor signals, the control circuit can detect when the mast projects above the top edge of the vehicle. The control circuit may control the actuator to hold the mast at a fixed position in which the distal end of the mast is marginally above the top edge, such as one foot, two feet, or three feet (e.g., approximately one meter) above the top edge, even if the mast has the ability to extend farther.

Optionally, instead of utilizing a sensor, the height of the vehicle may be stored in a database within memory of the control circuit. Based on identifying the type of vehicle that the assembly is mounted to, such as via operator input or stored trip information in the memory, the control circuit can control the actuator to raise the mast to a height that is associated with the height of the vehicle. For example, if the type of vehicle has a known height of 15 feet, the control circuit can command the actuator to raise the mast to 16 or 17 feet.

In an embodiment, while the mast is in the raised position, the control circuit is configured to monitor for conditions that represent designated lower events. In response to determining the occurrence of a designated lower event, the control circuit generates a signal to lower the mast from the raised position to a retracted position. One designated lower event may be determining that an upcoming segment of the route has a height restriction which poses a collision risk with the raised mast. The height restriction can be determined by comparing the current location of the vehicle, based on location signals, to known locations along the route of height restrictions as stored in a route database. Alternatively, the upcoming height restriction can be determined based on a camera or sensor disposed on a vehicle ahead of the vehicle on which the assembly is mounted. For example, the lead vehicle of the vehicle system shown in FIG. 3 may include a camera and/or sensors that generate data that can be analyzed to determine low clearance trees, tunnels, overpasses, or the like, as the lead vehicle travels under. The communication device on the assembly can receive a warning message from the lead vehicle indicating the upcoming low clearance. The receipt of such warning message can be the designated lower event that causes the control circuit to control the actuator to automatically retract the mast. Optionally, the control circuit may only lower the mast to the height of the vehicle based on signals received from the proximity sensor. The control circuit can raise the mast again after passing the height restriction.

One or more designated lower events may be based on environmental conditions. For example, in response to determining that the wind speed surrounding the vehicle exceeds a designated wind speed threshold, the control circuit may generate a signal to lower the mast. The wind speed threshold may be based on application-specific parameters, such as the structural rigidity of the mast. For example, the wind speed threshold may be selected based on the risk that the mast in the fully raised position can be damaged by the wind. The vehicle driving conditions can also represent one or more designated lower events. For example, if the speed of the vehicle exceeds a designated upper vehicle speed threshold, then the control circuit may lower the mast. At higher vehicle speeds, the inertial forces around curves and when braking could potentially damage the mast.

Other designated lower events may be based on indications that the vehicle has completed a trip or a segment of the trip. For example, upon detecting that the vehicle is stationary, the control circuit may generate a signal to lower the mast. The control circuit can detect that the vehicle is stationary based on a vehicle speed sensor, an accelerometer, and/or the like. Another lower event could be determining that the communication link between the communication device and the second communication device is terminated. Yet another lower event could be receiving a signal from an operator input device to turn Off the assembly and/or lower the mast. In an embodiment, the mast may automatically retract when not in use for storage purposes and to reduce the risk of damage to the mast.

Figure 7:
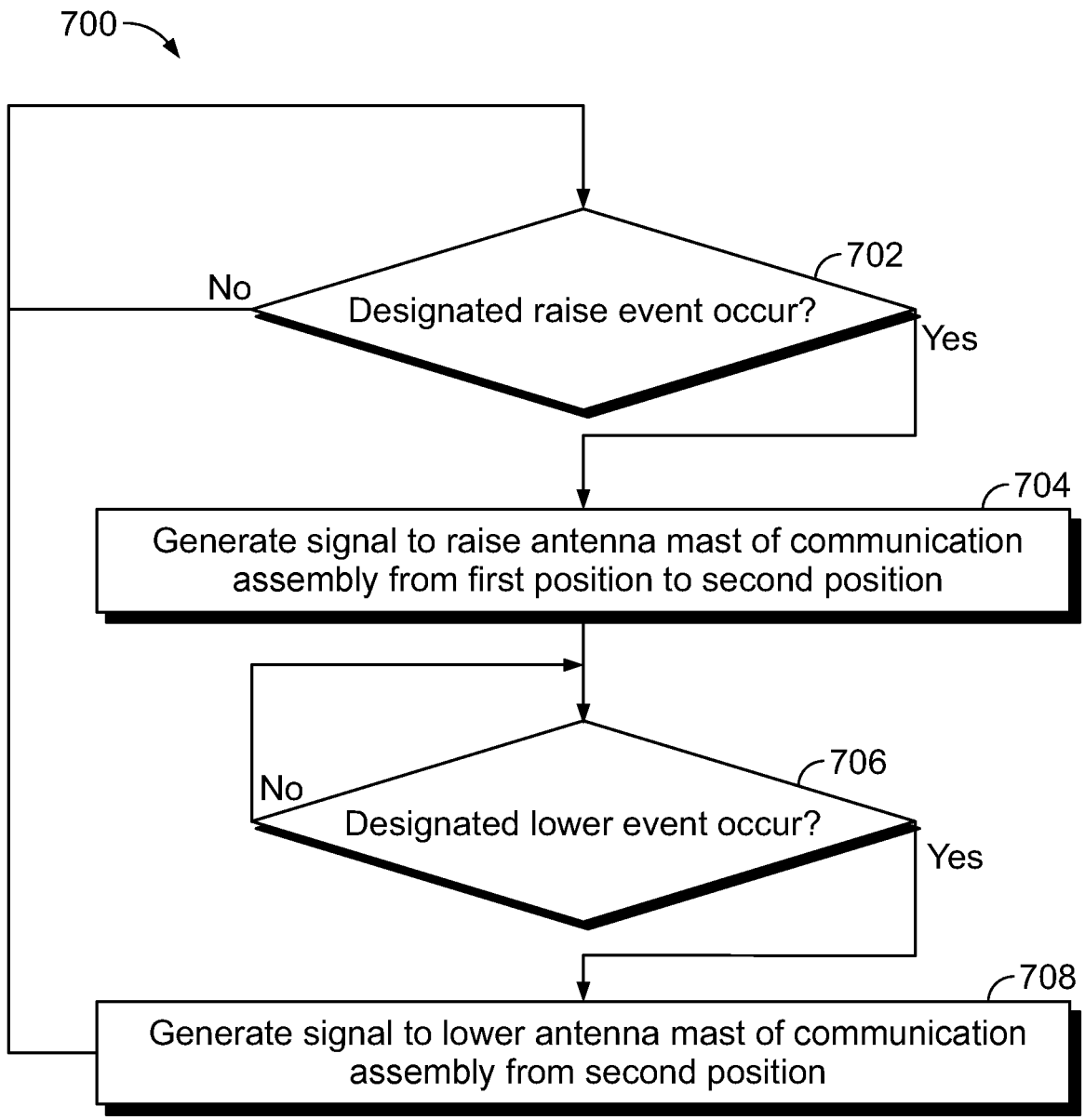
FIG. 7 is a flow chart of a method for controlling an extendable antenna mast of a communication assembly according to an embodiment.

FIG. 7 is a flow chart 700 of a method for controlling an extendable antenna mast of a communication assembly according to an embodiment. The method may be performed by the communication assembly described above with reference to FIGS. 1-6. Certain steps of the method may be performed by the control circuit shown in FIG. 4 based on programmed logic or instructions. The method optionally includes additional steps than shown, fewer steps than shown, and/or different steps than shown. At 702, a determination is made whether a designated raise event has occurred. If it is determined that the designated raise event has indeed occurred, then flow proceeds to 704 and a signal is automatically generated to raise an antenna mast of a communication assembly from a first position to a second position. The first and second position may be defined based on a common portion of the mast, such as a distal end of the mast. The distal end in the second position is located farther away from a housing of the assembly than in the first position. If, on the other hand, the designated raise event has not occurred, monitoring continues for the designated raise event.

At 706, with the mast at the second position, a determination is made whether a designated lower event has occurred. If it is determined that the designated lower event has indeed occurred, then flow proceeds to 708 and a signal is automatically generated to lower the antenna mast. The mast may be lowered back to the first position or to third position. If the designated lower event has not occurred, monitoring continues for the designated lower event.

One or more technical effects of the communication assembly described herein include the ability to improve communications by extending the antenna or antennae to heights that clear the local obstruction caused by the vehicle on which the assembly is mounted. The improved communications can result in fewer missed messages and misinterpretations of message content and/or increased location determination accuracy. Another technical effect is the ability to determine when and how to adjust the mast based on conditions experienced during use. The condition-based control of the mast height can enable selective balancing of the communication benefits achieved with a tall antenna mast with the associated increased risk of damage.

In one or more embodiments, an assembly (e.g., a communication assembly) is provided that includes a housing, a communication device, an extendable mast, and a control circuit. The housing is configured to be mounted on a vehicle. The communication device includes an antenna and is disposed at least partially within the housing. The extendable mast is mechanically coupled to the housing and supports the antenna. The control circuit is operably coupled to the mast and is configured to generate a signal to raise the mast from a first position of a distal end of the mast to a second position of the distal end in response to determining occurrence of a designated raise event. The antenna extends a greater distance from the housing in the second position of the mast than in the first position.

Optionally, the signal is a control signal that is communicated to an actuator mechanically coupled to the mast. The actuator is configured to automatically raise the mast in response to receipt of the control signal. The assembly may also include a proximity sensor mounted on the mast proximate to the distal end. The actuator may be configured to raise the mast until the control circuit determines, based on sensor signals from the proximity sensor, that the distal end of the mast is located above a top edge of the vehicle.

Optionally, the signal is an alert signal that is communicated to an output device. The output device may be configured to automatically generate a notification in response to receipt of the control signal for prompting an operator to manually raise the mast.

Optionally, the communication device is configured to communicate with a second communication device on another vehicle. The control circuit is configured to detect, as the designated raise event, one or more of degraded communication quality or total communication loss between the communication device and the second communication device.

Optionally, the assembly also includes a location determining device operably coupled to the control circuit and configured to generate location signals as the vehicle travels along a route. The control circuit may be configured to determine, as the designated raise event and based on the location signals, that an upcoming segment of the route is associated with degraded communications. The control circuit may be configured to determine, as the designated raise event and based on the location signals, that an upcoming segment of the route is clear of height restrictions.

Optionally, the control circuit is configured to detect, as the designated raise event, initiation of a communication linking procedure between the communication device and a second communication device on another vehicle. Optionally, the control circuit is configured to detect, as the designated raise event, that one or more of the vehicle is in motion or brakes of the vehicle are released. Optionally, the communication device is configured to receive, as the designated raise event, a command signal to raise the mast communicated from an operator input device.

Optionally, the assembly also includes a pneumatic actuator operably coupled to a brake line of the vehicle and configured to power the raising of the mast using compressed air received from the brake line.

Optionally, the control circuit is further configured to generate a second signal to lower the mast from the second position of the distal end of the mast to the first position and/or a third position of the distal end in response to determining occurrence of a designated lower event. The assembly may also include a location determining device operably coupled to the control circuit and configured to generate location signals as the vehicle travels along a route. The control circuit may be configured to determine, as the designated lower event and based on the location signals, that an upcoming segment of the route has a height restriction. Optionally, the control circuit is configured to detect, as the designated lower event, that the vehicle is stationary. Optionally, the control circuit is configured to determine, as the designated lower event and based on signals received from one or more sensors onboard the vehicle as the vehicle travels along a route, that (i) a wind speed exceeds a designated wind speed threshold and/or (ii) a speed of the vehicle exceeds a designated upper vehicle speed threshold.

Optionally, the vehicle on which the housing is mounted is located at a rear end of a vehicle system comprising multiple vehicles. The rear end is based on a direction of travel of the vehicle system along a route.

In one or more embodiments, a method (e.g., for controlling an extendable antenna mast) is provided that includes determining, via a control circuit of a communication assembly disposed on a vehicle, occurrence of a designated raise event. The communication assembly includes a housing and an extendable mast mechanically coupled to the housing. Responsive to determining the occurrence of the designated raise event, the method includes automatically generating a signal to raise the mast from a first position of a distal end of the mast to a second position of the distal end. The mast mechanically supports an antenna of a communication device of the communication assembly, and the antenna extends a greater distance from the housing in the second position of the mast than in the first position.

Optionally, determining the occurrence of the designated raise event includes detecting one or more of degraded communication quality or total communication loss between the communication device and a second communication device disposed on another vehicle.

Optionally, the method also includes receiving location signals at the control circuit. The location signals are generated by a location determining device of the communication assembly. Determining the occurrence of the designated raise event includes determining, based on the location signals as the vehicle travels along a route, that an upcoming segment of the route is associated with degraded communications and/or is clear of height restrictions.

Optionally, determining the occurrence of the designated raise event includes detecting initiation of a communication linking procedure between the communication device of the communication assembly and a second communication device on another vehicle. Optionally, determining the occurrence of the designated raise event includes detecting that one or more of the vehicle is in motion or brakes of the vehicle are released.

In one or more embodiments, an assembly (e.g., a communication assembly) is provided that includes a housing, an extendable mast, an antenna, and a control circuit. The housing is configured to be mounted on a vehicle. The mast is mechanically coupled to the housing and configured to extend and retract relative to the housing to control a position of a distal end of the mast. The antenna is mechanically coupled to and supported by the mast. The control circuit is operably coupled to the mast and configured to generate a first signal to raise the mast from a first position of the distal end to a second position of the distal end in response to determining occurrence of a designated raise event. The antenna extends a greater distance from the housing in the second position of the mast than in the first position. The control circuit is configured to generate a second signal to lower the mast from the second position of the distal end to the first position and/or a third position of the distal end in response to determining occurrence of a designated lower event.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An assembly comprising:
   a housing configured to be mounted on a vehicle;
   a communication device that includes an antenna, the communication device disposed at least partially within the housing;
   a mast that is extendable and supports the antenna, the mast mechanically coupled to the housing; and
   one or more processors operably coupled to the mast, the one or more processors configured to generate a control signal to lower the mast and decrease a distance that the antenna extends from the housing in response to the one or more processors determining occurrence of a designated lower event,
   wherein the one or more processors are configured to determine the occurrence of the designated lower event by one or more of:
      detecting that the vehicle is stationary,
      determining that a wind speed exceeds a designated wind speed threshold, or
      determining that a speed of the vehicle exceeds a designated vehicle speed threshold.

2. The assembly of claim 1, wherein the control signal is communicated to an actuator that is mechanically coupled to the mast, the actuator configured to automatically lower the mast in response to receipt of the control signal.

3. The assembly of claim 2, wherein the actuator is a pneumatic actuator that is operably coupled to a brake line of the vehicle and receives compressed air from the brake line to power raising the mast in response to receipt of the control signal.

4. The assembly of claim 1, wherein the one or more processors are configured to generate an alert signal that is communicated to an output device to notify an operator about the occurrence of the designated lower event.

5. The assembly of claim 1, wherein the communication device is configured to receive a command signal to lower the mast as the designated lower event, the command signal communicated from an operator input device.

6. The assembly of claim 1, wherein the one or more processors are further configured to generate a second control signal to raise the mast and increase the distance that the antenna extends from the housing, in response to determining occurrence of a designated raise event.

7. The assembly of claim 6, further comprising a proximity sensor mounted on the mast proximate to a distal end of the mast, wherein the one or more processors are configured to raise the mast in response to the occurrence of the designated raise event until the one or more processors determine, based on sensor signals from the proximity sensor, that the distal end of the mast is located at or above a top edge of the vehicle.

8. The assembly of claim 6, wherein the communication device is configured to communicate with a second communication device on another vehicle, the one or more processors configured to detect, as the designated raise event, one or more of degraded communication quality or total communication loss between the communication device and the second communication device.

9. The assembly of claim 6, further comprising a location determining device operably coupled to the one or more processors and configured to generate location signals as the vehicle travels along a route, wherein the one or more processors are configured to determine, as the designated raise event and based on the location signals, that the vehicle is approaching an upcoming segment of the route that is associated with degraded communication quality.

10. The assembly of claim 6, further comprising a location determining device operably coupled to the one or more processors and configured to generate location signals as the vehicle travels along a route, wherein the one or more processors are configured to determine, as the designated raise event and based on the location signals, that the vehicle is approaching an upcoming segment of the route that is clear of height restrictions.

11. The assembly of claim 6, wherein the one or more processors are configured to detect, as the designated raise event, initiation of a communication linking procedure between the communication device and a second communication device on another vehicle.

12. The assembly of claim 6, wherein the one or more processors are configured to detect, as the designated raise event, that one or both of (i) the vehicle is in motion or (ii) brakes of the vehicle are released.

13. The assembly of claim 1, further comprising a location determining device operably coupled to the one or more processors and configured to generate location signals as the vehicle travels along a route, wherein the one or more processors are configured to determine, as a second designated lower event and based on the location signals, that the vehicle is approaching an upcoming segment of the route that has a height restriction.

14. A method comprising:
   determining, via one or more processors of a communication assembly disposed on a vehicle, occurrence of a designated raise event, the communication assembly including a housing and a mast mechanically coupled to the housing, the mast being extendable and supporting an antenna of the communication assembly; and
   responsive to determining the occurrence of the designated raise event, automatically generating a control signal to raise the mast to increase a distance that the antenna extends from the housing,
   wherein determining the occurrence of the designated raise event comprises at least one of:
      detecting at least one of degraded communication quality or total communication loss between the communication assembly and a second communication assembly disposed on another vehicle;
      determining that the vehicle is approaching an upcoming segment of a route that is associated with degraded communication quality;

detecting initiation of a communication linking procedure between the communication assembly and the second communication assembly on the other vehicle;
detecting that the vehicle is in motion; or
detecting release of brakes of the vehicle.

15. The method of claim 14, further comprising:
receiving sensor signals from a proximity sensor; and
generating a second control signal to stop raising the mast in response to determining, based on the sensor signals that are received, that a distal end of the mast is located at or above a top edge of the vehicle.

16. The method of claim 14, further comprising receiving location signals at the one or more processors, the location signals generated by a location determining device of the communication assembly, wherein determining the occurrence of the designated raise event includes determining, based on the location signals as the vehicle travels along a route, that the vehicle is approaching an upcoming segment of the route that is clear of height restrictions.

17. The method of claim 14, further comprising generating a second control signal to lower the mast to reduce the distance that the antenna extends from the housing, in response to at least one of:
determining that the vehicle is approaching an upcoming segment of a route that has a height restriction;
determining that the vehicle is stationary;
determining that a wind speed relative to the vehicle exceeds a designated wind speed threshold; or
determining that a speed of the vehicle exceeds a designated vehicle speed threshold.

18. An assembly comprising:
a housing configured to be mounted on a vehicle;
a mast mechanically coupled to the housing and configured to extend and retract relative to the housing;
an antenna mechanically coupled to and supported by the mast; and
one or more processors operably coupled to the mast, the one or more processors configured to generate a first control signal to raise the mast and increase a distance that the antenna extends from the housing in response to determining occurrence of a designated raise event, the one or more processors configured to generate a second control signal to lower the mast and reduce the distance that the antenna extends from the housing in response to determining occurrence of a designated lower event,
wherein the one or more processors are configured to determine the occurrence of the designated raise event by one or more of:
detecting at least one of degraded communication quality or total communication loss between a communication device of the assembly and a second communication device disposed on another vehicle;
determining that the vehicle is approaching an upcoming segment of a route associated with degraded communication quality;
detecting initiation of a communication linking procedure between the communication device of the assembly and the second communication device disposed on the other vehicle;
detecting that the vehicle is in motion; or
detecting release of brakes of the vehicle.

* * * * *